United States Patent
Laneman et al.

(10) Patent No.: US 12,459,824 B2
(45) Date of Patent: Nov. 4, 2025

(54) METHOD OF PREPARING IODOSILANES AND COMPOSITIONS THEREFROM

(71) Applicant: ENTEGRIS, INC., Billerica, MA (US)

(72) Inventors: Scott A Laneman, Vernon Hills, IL (US); Thomas M. Cameron, Newtown, CT (US); Thomas H. Baum, New Fairfield, CT (US); David Kuiper, Brookfield, CT (US); David M. Ermert, Danbury, CT (US); Johathan W. Dube, Bomanville (CA)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 18/752,725

(22) Filed: Jun. 24, 2024

(65) Prior Publication Data
US 2024/0343591 A1    Oct. 17, 2024

Related U.S. Application Data

(62) Division of application No. 17/239,135, filed on Apr. 23, 2021, now abandoned.

(60) Provisional application No. 63/014,840, filed on Apr. 24, 2020.

(51) Int. Cl.
    *C01B 33/107* (2006.01)
(52) U.S. Cl.
    CPC .................. *C01B 33/107* (2013.01)
(58) Field of Classification Search
    CPC .. C01B 33/107; C01B 33/10773; C07F 7/123
    See application file for complete search history.

(56) References Cited

U.S. PATENT DOCUMENTS

| | | | |
|---|---|---|---|
| 4,962,219 A * | 10/1990 | Chadwick | C07F 7/0801 556/468 |
| 5,731,393 A | 3/1998 | Kojoh et al. | |
| 9,102,963 B2 | 8/2015 | Gohel et al. | |
| 10,106,425 B2 | 10/2018 | Kerrigan et al. | |
| 10,384,944 B2 | 8/2019 | Ritter et al. | |
| 2016/0264426 A1 | 9/2016 | Kerrigan et al. | |
| 2018/0099872 A1* | 4/2018 | Ritter | C01B 33/107 |

FOREIGN PATENT DOCUMENTS

| | | |
|---|---|---|
| CN | 1646425 A | 7/2005 |
| CN | 105237559 A | 1/2016 |
| CN | 105294752 A | 2/2016 |
| CN | 106928268 A | 7/2017 |
| CN | 109627257 A | 4/2019 |

(Continued)

OTHER PUBLICATIONS

Cussans, Studies Related to the Synthesis of Tetracycline, Thesis, University of London, United Kingdom, pp. 116, 1978.

(Continued)

*Primary Examiner* — Sally A Merkling
*Assistant Examiner* — Logan Edward Laclair

(57) ABSTRACT

Provided are complexes useful in the conversion of chloro- and bromo-silanes to highly desired iodosilanes such as $H_2SiI_2$ and $HSiI_3$, via a halide exchange reaction. The species which mediates this reaction is an iodide reactant comprising aluminum.

17 Claims, 1 Drawing Sheet

(56) References Cited

FOREIGN PATENT DOCUMENTS

TW           201900659 A      1/2019
WO     WO-2019182986 A1 *   9/2019   ................ C07F 3/02

OTHER PUBLICATIONS

Eaborn, Organosilicon Compounds. Part I. The formation of alkyliodosilanes, J. Chem. Soc., pp. 2755-2764, 1949.
Emeleus, H., et al.; Derivatives of Monosilane Part 2, The Iodo-compounds; Journal Chem Soc, 1941, 353-358.
Tamizhmani, G. et al., Some Physical Properties of Undoped Amorphous Silicon Prepared by a New Chemical Vapor Deposition Process Using Iodosilanes, Chem. vol. 2, pp. 473-476 , Mar. 27, 1990.

* cited by examiner

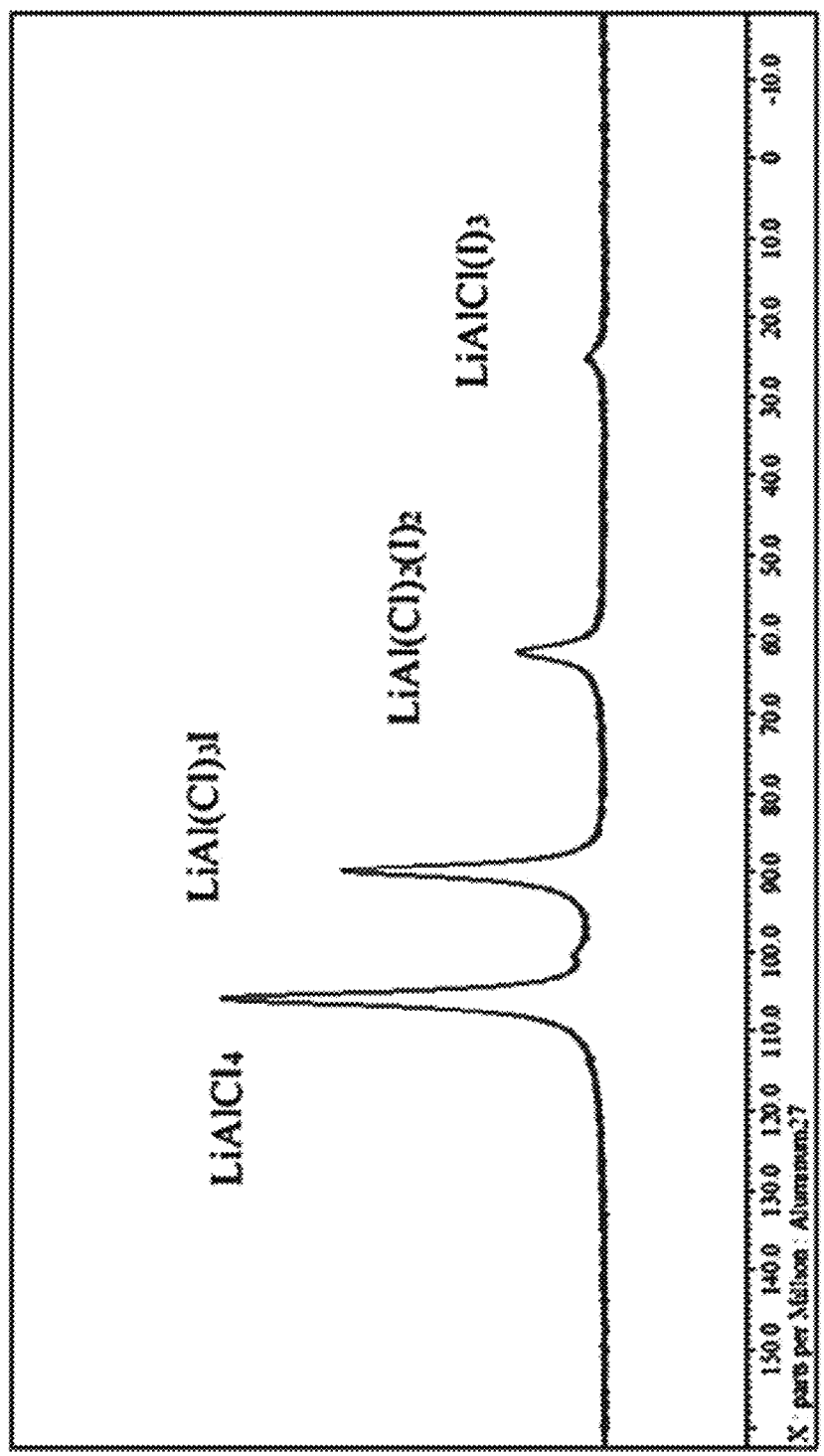

METHOD OF PREPARING IODOSILANES AND COMPOSITIONS THEREFROM

FIELD OF THE INVENTION

This invention belongs to the field of chemistry. It relates to methodology for preparing certain iodosilanes from the corresponding chloro- or bromo-silanes using an aluminum-mediated halide exchange process.

BACKGROUND OF THE INVENTION

Halosilanes are useful as precursors in the manufacturing of microelectronic devices. In particular, halosilanes such as $H_2SiI_2$ and $HSiI_3$ are useful as precursor compounds for the deposition of silicon-containing films used in the manufacture of microelectronic devices. Current solution-based synthetic methodology describes the synthesis of $H_2SiI_2$ and other select iodosilanes from i) aryl silanes (Keinan et al. J. Org. Chem., Vol. 52, No. 22, 1987, pp. 4846-4851; Kerrigan et. al. U.S. Pat. No. 10,106,425 or ii) halosilanes such as $SiH_2Cl_2$ (U.S. Pat. No. 10,384,944).

Keinan et al. describe a synthetic method towards $SiH_2I_2$ formation that employs stoichiometric treatment of Phenyl-$SiH_3$, an arylsilane, with iodine in the presence of a catalyst such as ethyl acetate. The reaction by-products are the aromatic function from the arylsilane, liberated as benzene, and a complicated by-product mixture resulting from ethyl acetate decomposition. Tedious separation of the reaction by-products from the desired $SiH_2I_2$ complicates the process. In addition, arylsilane-based methods for preparing halosilanes typically generate product contaminated with iodine and/or hydrogen iodide, which are deleterious to the desired iodosilane product, so often antimony, silver, or copper are utilized to stabilize the iodosilane product.

U.S. Pat. No. 10,106,425 teaches the use of an arylsilane, $(CH_3C_6H_4)SiH_3$, as reactant. The process as disclosed generates toluene as a by-product and is thus claimed as a less hazardous alternative to the Keinan method which generates benzene from Phenyl-$SiH_3$.

U.S. Pat. No. 10,384,944 describes a halide exchange between, for example, LiI and $SiH_2Cl_2$, thereby generating LiCl and $SiH_2I_2$ in a Finkelstein-like reaction.

SUMMARY OF THE INVENTION

In summary, the invention provides certain complexes useful in the conversion of chloro- and bromo-silanes to highly-desired iodosilanes such as $H_2SiI_2$ and $HSiI_3$, via a halide exchange reaction. The species which mediates this reaction is an iodide reactant comprising aluminum. In certain embodiments, the iodide reactant comprising aluminum is a compound having the formula (A):

$$[M^{+q}]_z[Al(X)_3I_w]_q \quad (A),$$

wherein z is 0 or 1, w is 0 or 1, M is chosen from (i) Group 1 metal cations chosen from $Li^+$, $Na^+$, $K^+$, $Rb^+$, and $Cs^+$; (ii) Group 2 metal cations chosen from $Mg^{2+}$, $Ca^{2+}$, $Sr^{2+}$, and $Ba^{2+}$; and (iii) ammonium or $C_1$-$C_6$ alkyl or benzyl ammonium cations; q is the valence of M and is 1 or 2, and X is chloro, bromo, or iodo, provided that when z and w are zero, X is iodo.

Examples of such iodide reactants includes, for example, $LiAl(I)_4$, $NaAl(I)_4$, $KAl(I)_4$, $Mg[Al(I)_4]_2$, $Ca[Al(I)_4]_2$, $LiAl(Cl)_3I$, $LiAlCl(I)_3$, $NaAl(Cl)_3I$, $NaAlCl(I)_3$, $KAl(Cl)_3I$, $KAlCl(I)_3$, $Mg[Al(Cl)_3I]_2$, $Mg[Al(Cl)(I)_3]_2$, $Ca[Al(Cl)_3I]_2$, $Ca[Al(Cl)(I)_3]_2$, $NH_4Al(I)_4$, $NH_4Al(Cl)_3I$, $NH_4Al(Cl)(I)_3$, $NaAl_2I_7$, $NaAl_3I_{10}$, and $Al(I)_3$.

BRIEF DESCRIPTION OF THE DRAWINGS

FIG. 1 is an $^{27}Al$ NMR spectrum of aluminates, of the form $LiAl(I)_x(Cl)_y$, in solution during conversion of $SiH_2Cl_2$ to $SiH_2I_2$ using in situ generated aluminate reagent. The aluminate was generated by combining three equivalents each of $AlCl_3$ and LiI with respect to $SiH_2Cl_2$. The reaction was heated at 60° C. for 1 hour and NMR data was acquired. See Example 8 for further details.

DETAILED DESCRIPTION OF THE INVENTION

In a first aspect, the invention provides a method for preparing an iodosilane having the formula (I) or (II)

$$SiR_xI_y \quad (I), \text{ or}$$

$$I_yR_xSi\text{—}SiR_xI_y \quad (II),$$

wherein x is 1, or 2, y is an integer of from 1 to 3, and wherein the sum of x plus y is 4 in formula (I) and 3 in formula (II) at each Si center, and wherein R is hydrogen or a $C_1$-$C_6$ alkyl group;

which comprises contacting a halosilane having the formula $$SiR_xD_y \text{ or } D_yR_xSi\text{-}SiR_xD_y,$$

wherein D is chloro or bromo,
with an iodide reactant comprising aluminum.

It should be appreciated that in this method, in order to form an iodosilane of formula (I), the halosilane reactant will necessarily be a compound of the formula $SiR_xD_y$. Similarly, in order to form an iodosilane of formula (II), the halosilane reactant will be a compound of the formula: $D_yR_xSi\text{-}SiR_xD_y$.

Exemplary iodosilanes as contemplated above include
$SiHI_3$,
$SiH_2I_2$,
$SiH_3I$,
$SiH_2CH_3I$,
$SiH_2(CH_2CH_3)I$,
$SiH_2(CH_2CH_2CH_3)I$,
$SiH_2((CH_3)_2CH)I$,
$SiH_2(CH_2CH_2CH_2CH_3)I$,
$SiH_2((CH_3)_3C)I$,
$SiHCH_3I_2$,
$SiH(CH_2CH_3)I_2$,
$SiH(CH_2CH_2CH_3)I_2$,
$SiH((CH_3)_2CH)I_2$,
$SiH(CH_2CH_2CH_2CH_3)I_2$,
$SiH((CH_3)_3C)I_2$,
$SiCH_3I_3$,
$Si(CH_2CH_3)I_3$,
$Si(CH_2CH_2CH_3)I_3$,
$Si((CH_3)_2CH)I_3$,
$Si(CH_2CH_2CH_2CH_3)I_3$,
$Si((CH_3)_3C)I_3$,
$I_3Si\text{—}SiI_3$,
$I_2CH_3Si\text{—}SiCH_3I_2$,
$I_2(CH_3CH_2)Si\text{—}Si(CH_2CH_3)I_2$,
$I_2(CH_3CH_2CH_2)Si\text{—}Si(CH_2CH_2CH_3)I_2$,
$I_2((CH_3)_2CH)Si\text{—}Si((CH_3)_2CH)I_2$,
$I_2(CH_3CH_2CH_2CH_2)Si\text{—}Si(CH_2CH_2CH_2CH_3)I_2$,
$I_2((CH_3)_3C)Si\text{—}Si((CH_3)_3C)I_2$,
$ICH_3HSi\text{—}SiHCH_3I$, I(CH₂CH₃)HSi—SiH(CH₂CH₃)I,
I(CH₂CH₂CH₃)HSi—SiH(CH₂CH₂CH₃)I,
I((CH₃)₂CH)HSi—SiH((CH₃)₂CH)I,
I(CH₂CH₂CH₂CH₃)HSi—SiH(CH₂CH₂CH₂CH₃)I, and
I((CH₃)₃C)HSi—SiH((CH₃)₃C)I.

In one embodiment, the iodosilane of the formula (I) is $H_2SiI_2$.

In one embodiment, the iodide reactant comprising aluminum is a compound having the formula (A):

$$[M^{+q}]_z[Al(X)_3I_w]_q \quad (A)$$

wherein z is 0 or 1, w is 0 or 1, M is chosen from (i) Group 1 metal cations chosen from $Li^+$, $Na^+$, $K^+$, $Rb^+$, and $Cs^+$; (ii) Group 2 metal cations chosen from $Mg^{2+}$, $Ca^{2+}$, $Sr^{2+}$, and $Ba^{2+}$; and (iii) ammonium, $C_1$-$C_6$ alkyl ammonium, or benzyl ammonium cations; q is the valence of M and is 1 or 2, and X is chloro, bromo, or iodo, provided that when z and w are zero, X is iodo.

In one embodiment, M is chosen from cations such as $(CH_3)_4N^+$, $(CH_3CH_2)_4N^+$, $(CH_3CH_2CH_2)_4N^+$, and $(CH_3CH_2CH_2CH_2)_4N^+$.

In another embodiment, z is 1 and w is 1, depending on the valence of the cation, M. In such cases, the anionic portion of compounds of formula (A), i.e., $[Al(X)_3I_w]_q$, can be referred to as aluminates and can be generated by reaction of the parent components in solution or in the solid state using 1:1 molar ratios of reactants (or 2:1 in the case of divalent Group 2 metal cations). By way of example, an $LiAl(I)_4$ aluminate can be prepared by mixing LiI and $Al(I)_3$ in solution or by reaction at high temperature when combined in a 1:1 molar ratio. The aluminates can be isolated easily from such reactions. The aluminates are isolable compounds and can thus be added to reaction mixtures to effect transformation of chloro- and bromosilanes to iodosilanes as described herein. Alternately, the above-mentioned aluminates can be prepared in situ and subsequently used for conversion of chloro- and bromosilanes to iodosilanes of formula (I) and (II) as set forth above. The properties and solid-state structure of the above described aluminates have been discussed in the literature by Braunstein (Braunstein, J. Advances in Molten Salt Chemistry, Volume 1, 1971) and Prömper and Frank (Prömper S. W. and Frank, W. *Acta Cryst.* 2017, E73, 1426).

Accordingly, in one embodiment, in the compounds of formula (A), z is 1, indicating "M" is present. Examples of compounds of the formula (A) wherein z is 1 include aluminates such as $LiAl(I)_4$, $NaAl(I)_4$, $KAl(I)_4$, $Mg[Al(I)_4]_2$, $Ca[Al(I)_4]_2$, $LiAl(Cl)_3I$, $LiAlCl(I)_3$, $NaAl(Cl)_3I$, $NaAlCl(I)_3$, $KAl(Cl)_3I$, $KAlCl(I)_3$, $Mg[Al(Cl)_3I]_2$, $Mg[Al(Cl)(I)_3]_2$, $Ca[Al(Cl)_3I]_2$, $Ca[Al(Cl)(I)_3]_2$, $NH_4Al(I)_4$, $NH_4Al(Cl)_3I$, $NH_4Al(Cl)(I)_3$, $NaAl_2I_7$, $NaAl_3I_{10}$, and the like.

In one embodiment, the iodide reactant comprising aluminum is aluminum triiodide (i.e., z and w are zero in formula (A)). In this regard, we have found that the displacement reaction occurs in the presence of aluminum triiodide alone; such aluminum triiodide can be used directly as the iodide reactant set forth herein or can be generated in situ by the reaction of aluminum metal with iodine. $Al(I)_3$ (and $AlCl_3$) are known to exist as tetrahedral based dimers but will be represented herein as monomeric species for the sake of simplicity.

Accordingly, in one embodiment, the invention provides a method for preparing a compound of the formula $H_2SiI_2$, which comprises contacting a compound of the formula $H_2SiCl_2$ with $Al(I)_3$. In another embodiment, the $Al(I)_3$ so utilized is generated in situ from elemental aluminum and iodine.

Additionally, $Al(X)_3$, when X is chloro, bromo, (or iodo) can be utilized in conjunction with a Group I or Group 2 iodide. In such cases, the aluminate species can be generated in situ by reacting, for example $AlCl_3$ with $MgI_2$, the latter of which can be formed in situ by the reaction of magnesium metal with iodine.

In these cases, multinuclear NMR analysis supports the hypothesis that the species formed is indeed an aluminate complex having the empirical formula $M_zAl(X)_3I$, as depicted above, which is believed to be the reactive species in this aluminum-mediated halogen displacement reaction. The aluminate species present in such reactions have been identified by $^{27}Al$ NMR spectroscopy. In a specific example $SiH_2Cl_2$ was treated with three equivalents of an aluminate reactant formed in situ from reaction of $AlCl_3$ and LiI. In this reaction $SiH_2I_2$ was generated with a 59% conversion as summarized in Example 8. The $^{27}Al$ NMR spectrum of the reaction mixture (FIG. 1) shows the aluminate species in the reaction responsible for the transformation of $SiH_2Cl_2$ to $SiH_2I_2$.

While not wishing to be bound by theory, we believe that this aluminate structure serves to mediate the displacement of the chlorine atoms on the silane to provide the desired iodosilanes.

In another embodiment, the iodide reactant is a compound of the formula $MAl_mI_n$, wherein M is an alkali metal, and
(i) m is 2 and n is 7, or
(ii) m is 3 and n is 10.

In this embodiment, the iodide reactant can be a compound having the formula $NaAl_2I_7$ or $NaAl_3I_{10}$. These compounds may be prepared as taught in Boef, G.; Brins Slot, H.; Van Leeuwen, R. A. W.; Wessels, H.; Van Spronsen, Johannes W., Zeitschrift fuer Anorganische und Allgemeine Chemie (1967), 353(1-2), 93-102.

In general, aluminate species exist in the form wherein the aluminate anion is present as $(AlX_4)^-$ and are synthesized by reaction of an aluminum halide, $AlX_3$, and a corresponding metal halide, $M^{+q}I_q$, (wherein "q" represents valence of the metal cation, and the total number of anionic species necessary to provide an uncharged formula) in a 1:1 molar ratio for the Group 1 congeners. In these cases, the literature refers to the system as a $0.5{:}0.5/AlX_3{:}M^{+q}I_q$ system wherein the actual chemical species that exists is $M^{+q}[AlX_4]_q$. Accordingly, and as an example, $LiAl(I)_4$ can be generated from reaction of equimolar amounts of LiI and $Al(I)_3$.

However, the above-mentioned aluminates can also exist when the reactants are combined in molar ratios that vary from the 1:1 example given. In these cases, the literature describes such systems as $AlX_3{:}M^{+q}I_q$ systems that are either $AlX_3$ rich or $M^{+q}I_q$ rich. The $NaAl_2I_7$ or $NaAl_3I_{10}$ compounds discussed above are examples where in both cases the systems are rich in $Al(I)_3$. An analogous situation also exists for the divalent Group 2 metal cation-based aluminates. In this embodiment of the invention the $AlX_3$ rich and the $M^{+q}I_q$ rich variations of the iodide reactant can also mediate the transformation of halosilane to iodosilane when the $AlX_3{:}M^{+'}I_v$ system is present in any ratios between 0.999:0.001 to 0.001:0.999.

In another embodiment, $Al(X)_3$ (X is chloro or iodo) can be utilized as a precursor for the conversion of chloro- and bromosilanes to iodosilanes. In this embodiment, equimolar mixtures of chloro- or bromosilane and $M^{+q}I_q$ (q=oxidation state of M; e.g., $MgI_2$, q=+2) can be treated with 5-25 mol % of $Al(X)_3$. When so treated the chloro- or bromosilanes are converted to iodosilanes. In these cases, the $AlX_3$ and $M^{+q}I_q$ react to form an aluminate species. In this regard, the reaction of $Al(X)_3$ with $M^{+q}I_q$ need not be in a 1:1 stoichiometric proportion. The aluminate can mediate the transformation of chloro- or bromosilane to iodosilane and the needed Al—I functionality is regenerated by reaction between the aluminate and $M^{+q}I_q$. As described above, the iodide reactant comprising aluminum can be added to the reaction as discrete materials or generated in situ where possible.

Thus, in a further embodiment, the iodide reactant comprising aluminum is generated in situ from a. $AlX_3$ and $M^{+q}X_q$;
b. $Al°$, $X_2$, and $M^{+q}X_q$;
c. $AlX_3$, $M°$, and $X_2$; or
d. $Al°$, $M°$, and $X_2$, wherein q represents the valence of M and X.

The methodology of the invention can be practiced neat or in the presence of an aprotic solvent which is non-reactive with the starting materials or iodosilane products. Such solvents include hydrocarbon solvents which are devoid of moieties such as oxygen, esters, carboxy groups, and ketones. Examples include benzene, toluene, hexane, cyclohexane, tetralin, decalin, mesitylene and the like.

The method for preparing the precursor compounds of the invention can be conducted in standard batch or continuous mode reactors. One of ordinary skill in the art would recognize the scale and type of reactors which could be utilized in the context of the reagents and products so produced.

Insofar as the methodology of the present invention generates neither iodine or hydrogen iodide, there is no need to utilize copper, antimony or silver compounds to stabilize the resulting iodosilane product. Additionally, in those cases where the iodide reactant does not comprise an alkali metal cation, such as is the case with $Al(I)_3$, ammonium iodide, or alkylammonium iodides, the resulting iodosilane product will thus necessarily also be free of alkali metal impurities. Accordingly, in a second aspect, the invention provides a precursor composition comprising a compound of the formula $SiH_2I_2$, having less than 1 ppm (parts per million) of antimony, silver, or copper impurities and less than about 1 ppm of sodium or lithium impurities. In a further aspect, the invention provides a precursor composition comprising a compound of the formula $SiH_2I_2$, having less than about 10 ppb (parts per billion) or less than about 5 ppb aluminum impurities.

Compounds of the formulae (I) and (II) are useful as precursors in the formation of silicon-containing films on the surface of a microelectronic device by methods such as atomic layer deposition. See for example, U.S. Pat. Nos. 10,580,645 and 10,424,477, incorporated herein by reference.

Compounds (I) and (II) can be introduced into a deposition chamber for the purposes of thermal CVD or ALD, or for the purposes of performing plasma-enhanced ALD or CVD. In these cases, a co-reactant gas can be introduced to deposit an $SiO_2$ film, via oxidation in an oxidizing environment with $O_2$, $O_3$, $N_2O$, or mixtures thereof. Similarly, compounds (I) and (II) can be introduced into a deposition chamber for the purposes of thermal CVD or ALD, or for the purposes of performing plasma-enhanced ALD or CVD. In these cases, a co-reactant gas can be introduced to deposit an SN film, via nitridation with $N_2$, $NH_3$, hydrazine or alkylhydrazine containing mixtures. The deposited films serve as dielectric layers within the microelectronic device.

EXAMPLES

This invention can be further illustrated by the following examples of certain embodiments thereof, although it will be understood that these examples are included merely for purposes of illustration and are not intended to limit the scope of the invention unless otherwise specifically indicated. All manipulations were carried out under inert atmosphere.

Example 1

To $LiAl(I)_4$ (0.13 g, 0.25 mmol) was added a solution of $SiH_2Cl_2$ in xylenes and benzene-d6 (0.025 g $SiH_2Cl_2$, 0.25 mmol $SiH_2Cl_2$, 1.0 ml benzene-d6, 0.075 g xylenes). The mixture was stirred at 60° C. for 45 minutes. The liquid was decanted from the solid ppt and placed in an NMR tube. Conversion of $SiH_2Cl_2$ to $SiH_2I_2$ was determined by analysis of the $^1H$ NMR spectrum of the reaction mixture. After 45 minutes of reaction time the distribution of reaction products was 92.4% $SiH_2I_2$ with 0.6% $SiH_2Cl_2$. There was also 7% of the monosubstituted product $SiH_2(Cl)(I)$ in the reaction mixture as determined by $^1H$ NMR spectroscopy.

Example 2

To a solid mixture of $Al(I)_3$ (0.02 g, 0.05 mmol) and $MgI_2$ (0.275 g, 1.0 mmol) was added a solution of $SiH_2Cl_2$ in xylenes and benzene-d6 (0.10 g $SiH_2Cl_2$, 1.0 mmol $SiH_2Cl_2$, 1.0 ml benzene-d6, 0.30 g xylenes). The mixture was stirred for 50 minutes at 60 C°. The liquid was decanted from the solid ppt and placed in an NMR tube. Conversion of $SiH_2Cl_2$ to $SiH_2I_2$ was determined by analysis of the $^1H$ NMR spectrum of the reaction mixture. After 50 minutes of reaction time the distribution of reaction products was 92.3% $SiH_2I_2$ with 0.7% $SiH_2Cl_2$. There was also 7% of the monosubstituted product $SiH_2(Cl)(I)$ in the reaction mixture as determined by $^1H$ NMR spectroscopy.

Example 3

In situ generation of $LiAl(I)_4$: To a 3.0 ml quantity of benzene d6 was added $Al°$ (0.050 g, 1.85 mmol), $I_2$ (0.375 g, 1.5 mmol), and LiI (0.13 g, 1 mmol) to afford a dark red colored mixture. The mixture was stirred at 60° C. After one hour the initial red color of the mixture dissipated and gave a colorless mixture. To the in situ generated $LiAl(I)_4$ was added a solution of $SiH_2Cl_2$ in xylenes (0.10 g $SiH_2Cl_2$, 1.0 mmol $SiH_2Cl_2$, 0.30 g xylenes). The mixture was stirred at 60° C. Conversion of $SiH_2Cl_2$ to $SiH_2I_2$ was determined by analysis of the $^1H$ NMR spectrum of the reaction mixture. After 60 minutes of reaction time the distribution of reaction products was 90% $SiH_2I_2$ with 1% $SiH_2Cl_2$. There was also 8.6% of the monosubstituted product $SiH_2(Cl)(I)$ in the reaction mixture as determined by $^1H$ NMR spectroscopy.

Example 4

In situ generation of $Al(I)_3$: To a 2.0 ml quantity of benzene d6 was added $Al°$ (0.030 g, 1.1 mmol) and $I_2$ (0.375 g, 1.5 mmol) to afford a dark red colored mixture. After stirring at 70° C. for 1.5 hours the color dissipated to afford a colorless mixture. To the in situ generated $Al(I)_3$ was added a solution of $SiH_2Cl_2$ in xylenes (0.025 g $SiH_2Cl_2$, 0.25 mmol $SiH_2Cl_2$, 0.075 g xylenes). The mixture was stirred at 60° C. for one hour. Conversion of $SiH_2Cl_2$ to $SiH_2I_2$ was determined by analysis of the $^1H$ NMR spectrum of the reaction mixture. After 60 minutes of reaction time the distribution of reaction products was 91% $SiH_2I_2$ with 0.5%

$SiH_2Cl_2$. There was also 7% of the monosubstituted product $SiH_2(Cl)(I)$ in the reaction mixture as determined by $^1H$ NMR spectroscopy.

Example 5

To $Al(I)_3$ (0.10 g, 0.25 mmol) was added a solution of $SiH_2Cl_2$ in xylenes and benzene-d6 (0.025 g $SiH_2Cl_2$, 0.25 mmol $SiH_2Cl_2$, 1.0 ml benzene-d6, 0.075 g xylenes). The mixture was stirred at 60° C. for 35 minutes. The mixture was placed in an NMR tube. Conversion of $SiH_2Cl_2$ to $SiH_2I_2$ was determined by analysis of the $^1H$ NMR spectrum of the reaction mixture. After 35 minutes of reaction time the distribution of reaction products was 79% $SiH_2I_2$ with 5% $SiH_2Cl_2$. There was also 16% of the monosubstituted product $SiH_2(Cl)(I)$ in the reaction mixture as determined by $^1H$ NMR spectroscopy.

Example 6

To $LiAl(I)_4$ (0.40 g, 0.74 mmol) in 1.0 ml benzene-d6 was added $SiHCl_3$ (0.10 g $SiHCl_3$, 0.74 mmol $SiHCl_3$). The mixture was stirred at 60° C. for 45 minutes. The mixture was placed in an NMR tube and there was insoluble material present. Conversion of $SiHCl_3$ to $SiHI_3$ was determined by analysis of the $^1H$ NMR spectrum of the reaction mixture. After 45 minutes of reaction time the distribution of reaction products was 61% $SiHI_3$ with 23.3% $SiHCl_3$. There were also mixed ligand species present in the following amounts: 6.9% $SiH(Cl)_2(I)$ and 8.8% $SiH(Cl)(I)_2$.

Example 7

A summary of reactions and conditions generating diiodosilane from dichorosilane with aluminate coreactants are presented in Table 1. The reactions were carried out by addition of one equivalent of dichlorosilane to two equivalents of the indicated, in situ generated, iodoaluminate under the conditions described. The percent conversion to diiodosilane was determined by analysis of $^1H$ NMR spectra of the reaction mixtures.

TABLE 1

| Aluminate generated in situ from: | | 4 hours at 20° C. in toluene | | | | 4 hours at 20° C. in hexane | | | |
|---|---|---|---|---|---|---|---|---|---|
| $AlX_3$ | MI | $H_2SiCl_2$ | $H_2SiClI$ | $H_2SiI_2$ | $HSiI_3$ | $H_2SiCl_2$ | $H_2SiClI$ | $H_2SiI_2$ | $HSiI_3$ |
| $AlCl_3$ | LiI | 24.1% | 27.5% | 41.5% | 0.0% | 27.2% | 29.2% | 41.4% | 0.0% |
| $AlCl_3$ | NaI | 15.2% | 27.2% | 57.0% | 0.0% | 90.2% | 6.4% | 0.6% | 0.0% |
| $AlCl_3$ | KI | 55.6% | 26.6% | 17.1% | 0.0% | 97.8% | 1.9% | 0.0% | 0.0% |
| $AlCl_3$ | $NH_4I$ | 42.3% | 29.2% | 28.6% | 0.0% | 99.8% | 0.2% | 0.0% | 0.0% |
| $AlI_3$ | LiI | 0.4% | 4.4% | 94.7% | 0.0% | 1.5% | 9.3% | 83.4% | 5.6% |
| $AlI_3$ | NaI | 0.7% | 6.2% | 90.0% | 3.1% | 3.1% | 13.9% | 80.0% | 2.8% |
| $AlI_3$ | KI | 1.1% | 8.0% | 80.1% | 0.0% | 4.8% | 16.5% | 75.5% | 2.8% |
| $AlI_3$ | $NH_4I$ | 2.5% | 12.2% | 73.1% | 0.0% | 5.0% | 16.4% | 76.8% | 1.5% |

Example 8

A summary of reactions and conditions generating diiodosilane from dichorosilane with various reagents is presented in Table 2. The reactions were carried out by addition of a 25% dichlorosilane/xylene solution to the indicated iodide source in benzene-d6. The reaction time and temperatures are indicated and the percent conversion to diiodosilane was determined by $^1H$ NMR spectroscopy. The indicated equivalents (eq) of reagent used are with respect to using one equivalent of dichlorosilane in each reaction presented.

TABLE 2

| Temp | Time | Iodide source (eq) | Al source (eq) | $H_2SiI_2$ (%) | $H_2Si(I)Cl$ (%) | $H_2SiCl_2$ (%) | $HSiI_3$ (%) | $H_3Si(I)$ (%) |
|---|---|---|---|---|---|---|---|---|
| 60° C. | 1 hr | — | $AlI_3$ (4) | 83 | 12 | 4 | 2 | 0 |
| 60° C. | 1 hr | LiI(4) | $AlI_3$ (4) | 96 | 2.5 | 0 | 1.4 | 0.1 |
| 60° C. | 35 min | — | $Al(I)_3$ (1) | 79 | 16 | 5 | 0 | 0 |
| 60° C. | 45 min | $(CH_3)_4NI$ (4) | $AlCl_3$ (0.5) | 20.5 | 28 | 51.5 | 0 | 0 |
| 70 C. | 1.25 hr | LiI (4) | $AlCl_3$ (2) | 83 | 14 | 3 | 0 | 0 |
| 60° C. | 16 hr | LiI (3) | — | 35 | 64 | 64 | 1 | 0.1 |
| 60° C. | 16 hr | $(CH_3)_4NI$ (3) | — | 0 | 0 | 100 | 0 | 0 |
| 60° C. | 1 hr | LiI (3) | $AlCl_3$ (3) | 59 | 26 | 15 | 0.12 | 0.06 |
| 60° C. | 2.5 hr | $CaI_2$ (4) | $AlCl_3$ (1) | 73 | 19.5 | 7 | 0.36 | 0.31 |
| 60° C. | 1.75 hr | $(Bu_4N)I$ (4) | $AlCl_3$ (1) | Obscured | 27 | 73 | obscured | obscured |
| 60° C. | 1.5 hr | $CaI_2$ (4) | $AlCl_3$ (0.25) | 63.5 | 24 | 12 | 0.13 | 0.10 |
| 60° C. | 2 hr | $CaI_2$ (4) | — | 0.3 | 5 | 94 | 0 | 0 |
| 60° C. | 1 hr | $I_2$ (6) | $Al^0$ (4) | 91 | 7 | 0.5 | 1.6 | 0 |
| 60° C. | 1.5 hr | — | $Al^0$ (4) | 0 | 0 | 100 | 0 | 0 |
| 60° C. | 40 min | $LiAl(I)_3Cl$ (4) | $LiAl(I)_3Cl$ (4) | 91 | 8 | 0.8 | 0.52 | 0.09 |

TABLE 2-continued

| Temp | Time | Iodide source (eq) | Al source (eq) | $H_2SiI_2$ (%) | $H_2Si(I)Cl$ (%) | $H_2SiCl_2$ (%) | $HSiI_3$ (%) | $H_3Si(I)$ (%) |
|---|---|---|---|---|---|---|---|---|
| 60° C. | 45 min | $LiAlI_4$ (1) | $LiAlI_4$ (1) | 92.4 | 7 | 0.6 | 0 | 0 |
| 60° C. | 1 hr | LiI (1) and $I_2$(1.5) | $Al^0$ (1) | 90 | 8.6 | 1 | 0 | 0.4 |
| 60° C. | 1 hr | $MgI_2$ (1) | $AlCl_3$ (0.25) | 94 | 5 | 1 | 0 | 0 |
| 60° C. | 1 hr 50 min | $MgI_2$ (1) | 0 | 9.4 | 21.8 | 68.8 | 0 | 0 |
| 60° C. | 1 hr | $MgI_2$ (1) | $Al(I)_3$ (0.15) | 93.5 | 6 | 0.5 | 0 | 0 |
| 60° C. | 50 min | $MgI_2$ (1) | $Al(I)_3$ (0.05) | 92.3 | 7 | 0.7 | 0 | 0 |
| 60° C. | 45 min | $MgI_2$ (1) | $AlCl_3$ (0.05) | 87 | 11 | 2 | 0 | 0 |

Example 9

A summary of reaction conditions for conversion of trichlorsilane to triiodosilane using $Al(I)_3$ or aluminate reagents is presented in Table 3. Reactions were carried out in $C_6D_6$ at 100° C. in sealed containers for 16 hours. The percent distribution of silane products was determined by $^1H$ NMR spectroscopy. The indicated equivalents (eq) of reagent used are with respect to using one equivalent of dichlorosilane in each reaction.

TABLE 3

| Al source (eq) | Iodide source (eq) | $HSiI_3$ | $HSiCl_2(I)$ | $HSiCl(I)$ | $HSiCl_3$ |
|---|---|---|---|---|---|
| $Al(I)_3$ (1) | 0 | 53% | 12% | 20% | 13% |
| $Al(I)_3$ (3) | 0 | 72% | 6% | 17% | 3% |
| $Al(I)_3$ (3) | LiI (1) | 87% | 2% | 10% | 0.5% |
| $Al(I)_3$ (3) | LiI (2) | 93% | 0.5% | 6% | 0.2% |
| $Al(I)_3$ (4) | LiI (3) | 93% | 1% | 7% | 0.2% |
| $Al(I)_3$ (3) | LiI (2) | 94% | 0.5% | 6% | 0.1% |

Example 10

A summary of reaction conditions for conversion of trichlorsilane to triiodosilane using various in situ generated aluminates is shown in Table 4 with relevant reaction conditions. An equimolar ratio of reactants was used and the percent conversion to the indicated silanes was determined by $^1H$ NMR spectroscopy.

TABLE 4

| Aluminate generated in situ from: | | Solvent | 5.5 hours at 20° C. | | | | 23 hours at 20° C. | | | |
|---|---|---|---|---|---|---|---|---|---|---|
| | | | $HSiCl_3$ | $HSiCl_2I$ | $HSiClI_2$ | $HSiI_3$ | $HSiCl_3$ | $HSiCl_2I$ | $HSiClI_2$ | $HSiI_3$ |
| $Al(I)_3$ | LiI | Toluene | 6.3% | 4.6% | 12.0% | 77.2% | 4.3% | 4.2% | 12.7% | 78.8% |
| $Al(I)_3$ | LiI | Hexane | 23.5% | 10.6% | 15.2% | 50.7 | 4.5% | 7.6% | 21.9% | 66.0% |
| $Al(I)_3$ | NaI | Toluene | 7.5% | 6.8% | 16.0% | 69.7% | 7.0% | 6.7% | 16.4% | 69.9% |
| $Al(I)_3$ | NaI | Hexane | 8.5% | 10.1% | 16.9% | 64.5% | 4.2% | 6.4% | 17.2% | 72.2% |
| $Al(I)_3$ | KI | Toluene | 2.6% | 2.6% | 10.6% | 84.2% | 2.3% | 2.3% | 10.0% | 85.5% |
| $Al(I)_3$ | KI | hexane | 18.8% | 10.0% | 16.7% | 54.4% | 6.7% | 6.8% | 16.2% | 70.3% |

Example 11

A summary of reaction parameters for the conversion of trichlorsilane to triiodosilane using $MgI_2$, $CaI_2$, $ZnI_2$, and $AlI_3$ as the 'sole' reactants in solution. The indicated percent conversions were determined by $^1H$ NMR spectroscopy. The indicated equivalents (eq) of iodine-containing reagent used are relative to using one equivalent of dichlorosilane in each reaction. Only $AlI_3$ reagent yields $SiHI_3$ under these reaction conditions.

TABLE 5

| | | 5 hours at 60° C. | | | |
|---|---|---|---|---|---|
| Solvent | Reagent (eq) | $HSiI_3$ | $HSiCl_2I$ | $HSiClI_2$ | $HSiCl_3$ |
| Toluene | $MgI_2$ (1.5) | 0 | 4.5% | 0 | 95.5% |
| Hexane | $MgI_2$ (1.5) | 0 | 3% | 0 | 97% |
| Toluene | $CaI_2$ (1.5) | 0 | 0 | 0 | 100% |
| Hexane | $CaI_2$ (1.5) | 0 | 0 | 0 | 100% |
| Toluene | $ZnI_2$ (1.5) | 0 | 0 | 0 | 88% |
| Hexane | $ZnI_2$ (1.5) | 0 | 0 | 0 | 99% |
| Toluene | $AlI_3$ (1.0) | 60% | 10% | 19% | 11% |
| hexane | $AlI_3$ (1.0) | 53% | 13% | 19% | 15% |

Example 12

In a typical procedure used to generate $SiH_2I_2$ iodine (335 grams, 1.32 mol) was charged into a flask and toluene was added to make a concentrated solution. To a separate flask was charged aluminum (25 grams, 0.926 mol, 20-40 mesh) and toluene was added to make a slurry. At an internal temperature of 45° C. the iodine solution was slowly added to the aluminum over 3 hours, maintaining an internal temperature of 45-55° C. The residual undissolved iodine was dissolved in toluene and charged into the reaction mixture repeatedly until no iodine remained. After the complete addition of iodine, the reaction mixture was stirred at 45-50° C. for 2 hours, followed by stirring for 12 hours at room temperature. The volatiles were removed in vacuo at 40° C. to leave a concentrated mixture. Hexanes were added to the mixture to further precipitate the solid $Al(I)_3$. The solid $Al(I)_3$ was rinsed with hexanes twice and resuspended in hexanes to give an $Al(I)_3$ suspension. To the $Al(I)_3$ suspension was added $SiH_2Cl_2$ (135 grams, 1.33 mol) over 5 minutes. The reaction mixture was stirred at 20° C. for 1 hour, and then was heated to 35° C. for 3 hours. The reaction mixture was cooled to 20° C. and filtered. The solids were rinsed three times with hexanes and the filtrates were combined. The filtrate was analyzed and revealed 75% conversion to $SiH_2I_2$. The volatiles were removed in a distillation system at 50-300 torr and an internal temperature of 35-50° C. The product was distilled at 45-50° C. at 8-20 Torr to afford 192 grams of $SiH_2I_2$ in 52% yield.

The invention has been described in detail with particular reference to certain embodiments thereof, but it will be understood that variations and modifications can be affected within the spirit and scope of the invention. Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. Changes may be made in details, particularly in matters of shape, size, and arrangement of parts without exceeding the scope of the disclosure. The disclosure's scope is, of course, defined in the language in which the appended claims are expressed

The invention claimed is:

1. A composition comprising: $SiH_2I_2$; $SiH_2Cl_2$; $SiH_2(Cl)(I)$; and an aluminum containing catalyst.

2. The composition of claim 1 wherein the composition is neat.

3. The composition of claim 1, comprising an aprotic solvent.

4. The composition of claim 1, wherein the $SiH_2I_2$ makes up at least 92 mol % of the all silicon containing species in the composition.

5. A composition consisting of: $SiH_2I_2$; $SiH_2Cl_2$; $SiH_2(Cl)(I)$; an aluminum containing catalyst; and optionally an aprotic solvent.

6. The composition of claim 1, wherein the aluminum containing catalyst comprises $LiAl(I)_4$.

7. The composition of claim 1, wherein the aluminum containing catalyst comprises $AlX_3$, where X is a halide.

8. The composition of claim 1, wherein the aluminum containing catalyst is formed in situ using aluminum metal.

9. The composition of claim 1, further comprising a magnesium halide.

10. The composition of claim 5, wherein the composition is neat.

11. The composition of claim 5, wherein the composition includes an aprotic solvent.

12. The composition of claim 5, wherein the aluminum containing catalyst comprises $LiAl(I)_4$.

13. The composition of claim 5, wherein the aluminum containing catalyst comprises $AlX_3$, where X is a halide.

14. The composition of claim 5, wherein the aluminum containing catalyst is formed in situ using aluminum metal.

15. A composition consisting of: $SiH_2I_2$; $SiH_2Cl_2$; $SiH_2(Cl)(I)$; an aluminum containing catalyst; a magnesium halide; and optionally an aprotic solvent.

16. The composition of claim 15, wherein the composition is neat.

17. The composition of claim 15, wherein the composition includes an aprotic solvent.

* * * * *